July 14, 1931. W. W. SAYERS 1,814,769
AUTOMATIC LOADER
Filed Feb. 4, 1928 4 Sheets-Sheet 4
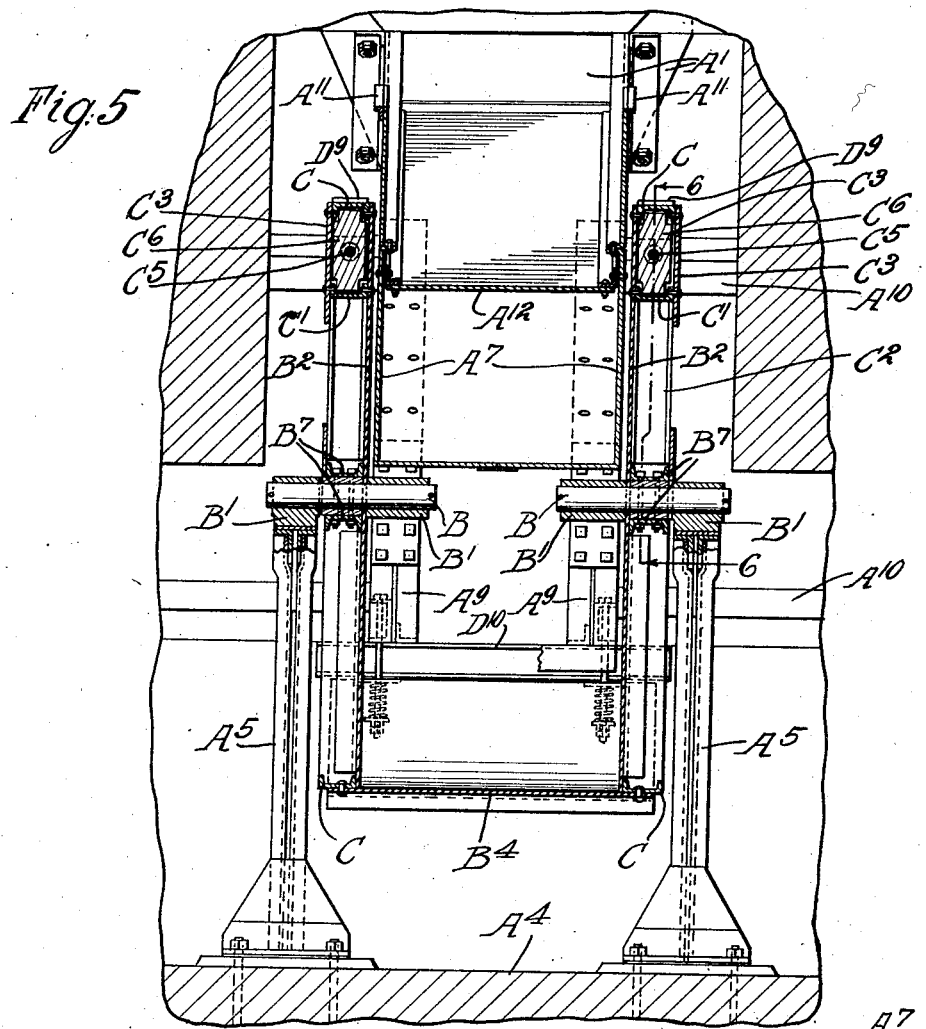
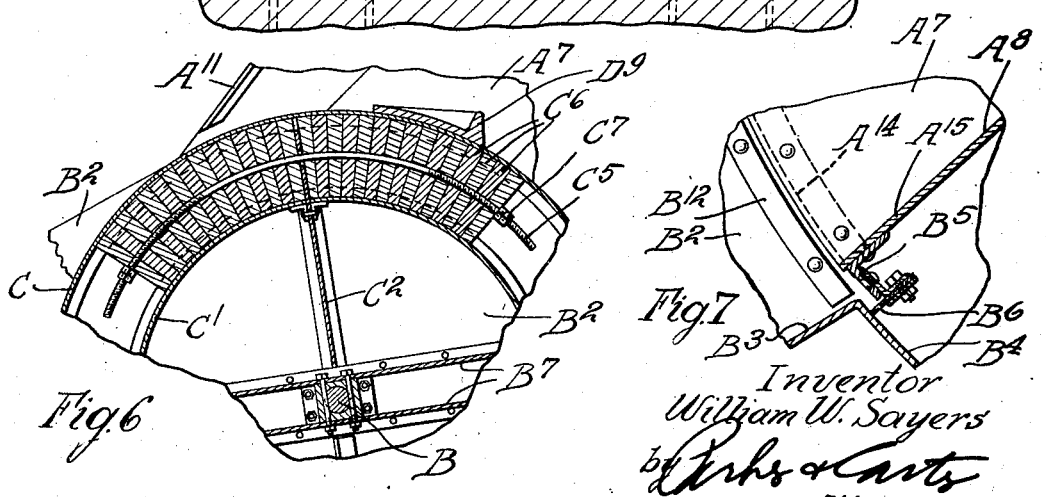

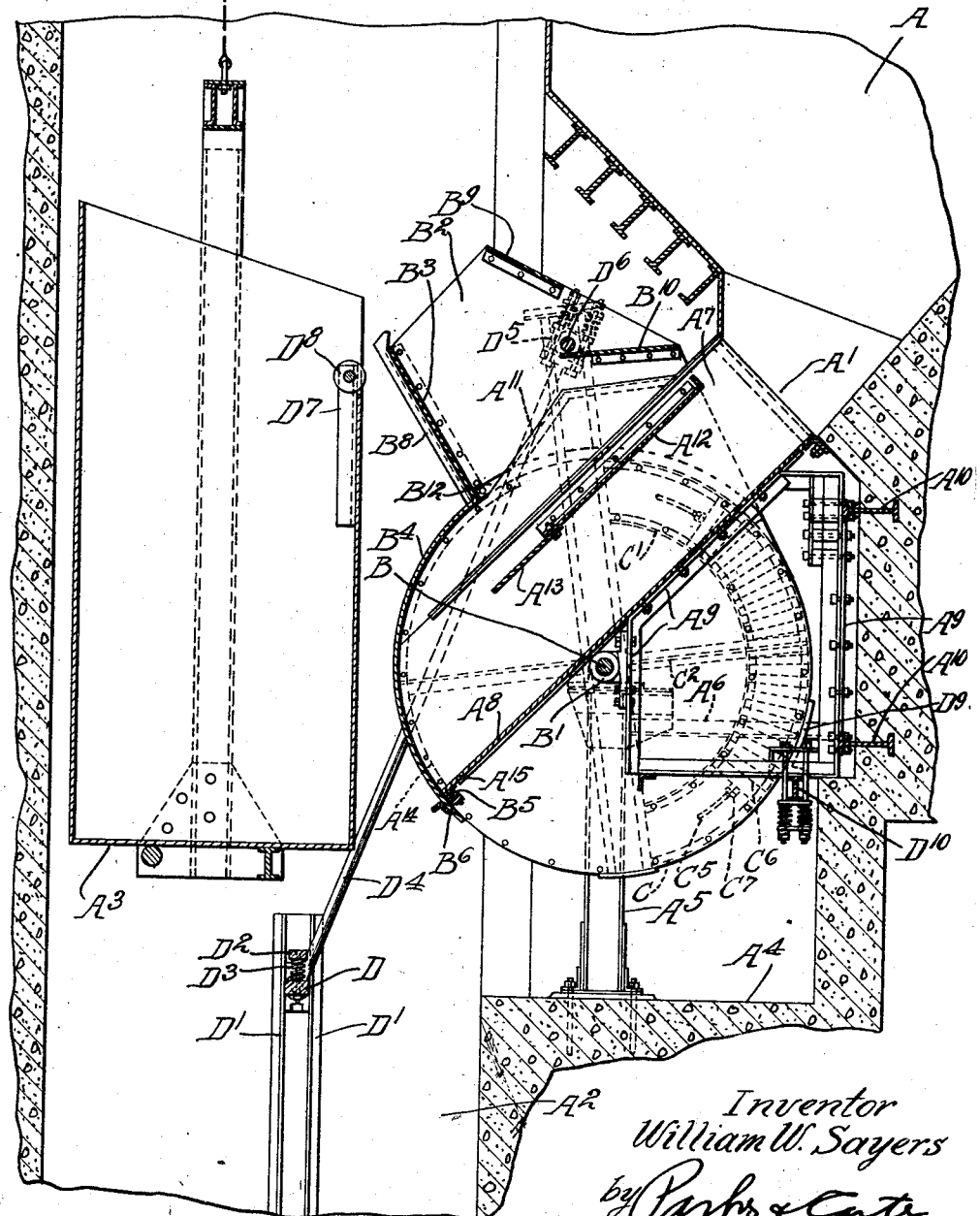

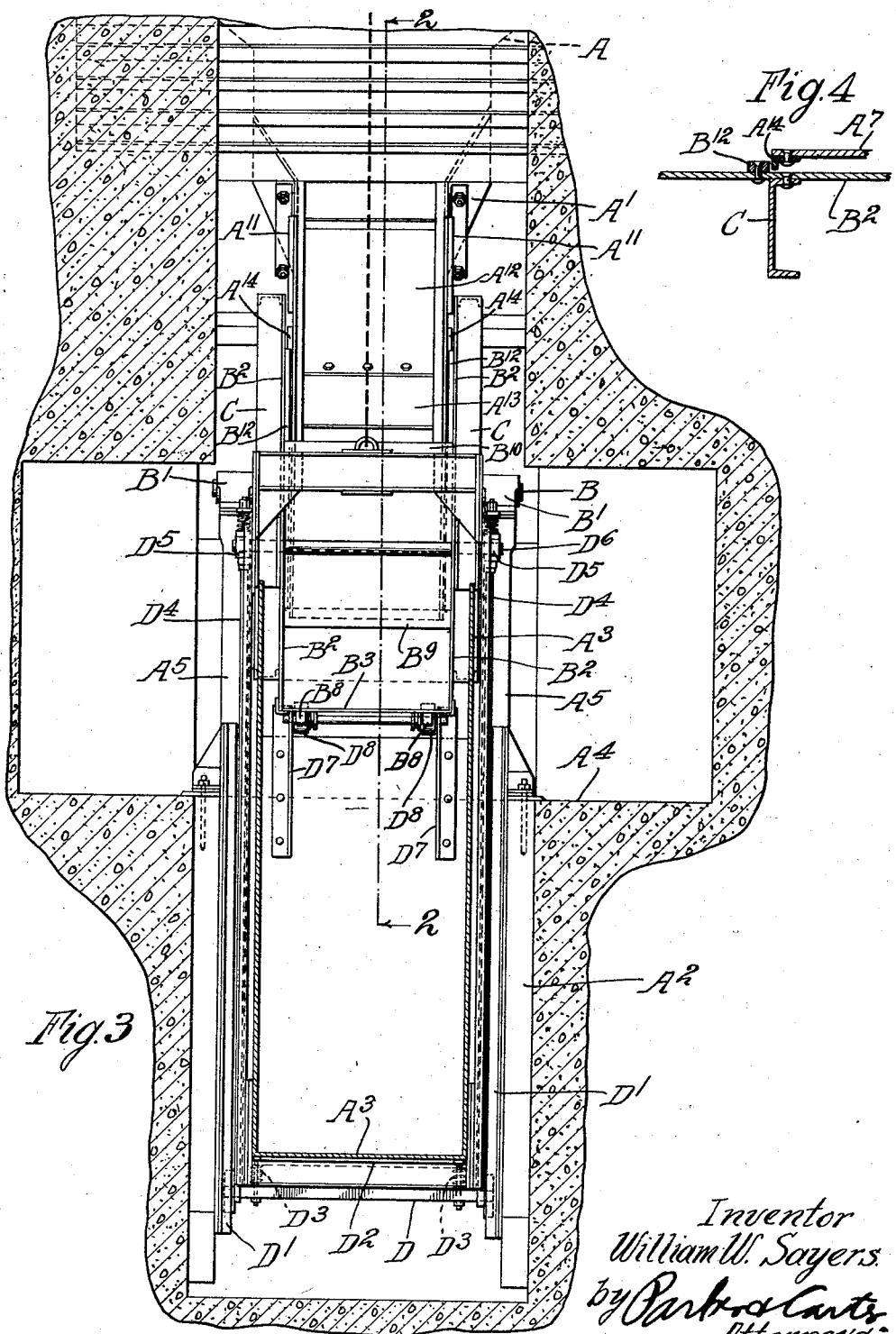

Patented July 14, 1931

1,814,769

UNITED STATES PATENT OFFICE

WILLIAM W. SAYERS, OF CHICAGO, ILLINOIS, ASSIGNOR TO LINK-BELT COMPANY, OF CHICAGO, ILLINOIS, A CORPORATION OF ILLINOIS

AUTOMATIC LOADER

Application filed February 4, 1928. Serial No. 251,835.

My invention relates to improvements in skip hoists and has for one object to provide a new and improved type of skip hoist wherein a single unit combined undercut gate and pivoted chute may be used to conduct the coal or similar material from a hopper to a skip, which travels when in loading relation with the hopper along a vertical path.

Many efforts in the past have been made to solve this particular problem in connection with gate chute and skip combinations of the self-damming type, where the bucket fills and the material dams up in the chute, always heretofore without success because of the difficulty involved in providing a place for the coal in the chute when the chute is rotated from the delivery to the closed position.

My arrangement solves this problem as applied to loading the skip in a vertical position during the time that it is in co-operation with the chute because the relation between the fixed chute, the pivoted chute and the shape and arrangement of the pivoted chute with the louvres or spaces as indicated furnishes ample room for the coal carried up with the pivoted chute so that the coal may be handled without squeezing, crowding or jamming the parts.

Among the objects of my invention are to provide a combined undercut gate and pivoted chute which may be used with a horizontally traveling skip. Also to provide new and improved mechanisms whereby the chute and gate will be easily and smoothly operated and to provide a device which will be simple and inexpensive to construct, durable and positive in operation. Other objects of the invention will appear from time to time in the course of the specification.

My invention is illustrated more or less diagrammatically in the accompanying drawings wherein—

Figure 2 is a section along the line 2—2 of Figure 3 showing the skip as it starts up with the gate and chute in the closed position;

Figure 3 is a section along the line 3—3 of Figure 1;

Figure 4 is a section along the line 4—4 of Figure 1;

Figure 5 is a section along the line 5—5 of Figure 1;

Figure 6 is a detail section illustrating the counterweight, taken along the line 6—6 of Figure 5;

Figure 7 is a detail section of the gate and packing means.

Like parts are indicated by like characters throughout the specification and drawings.

Figure 1:
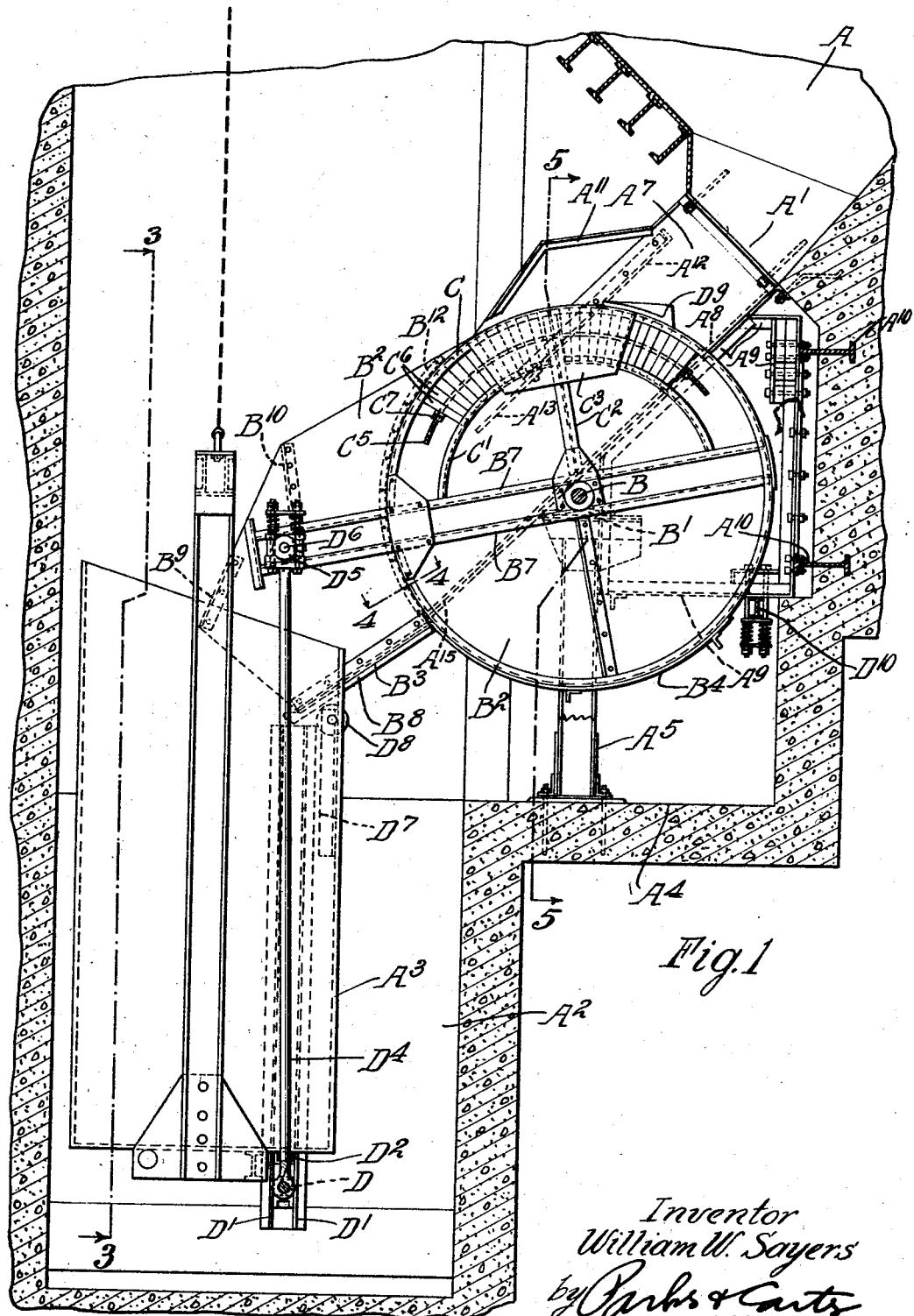
Figure 1 is a side elevation showing the skip in the loading position.

A is a hopper having a discharge port $A^1$. $A^2$ is a pit into which the skip $A^3$ is adapted to descend. The guides for the skip and the means for controlling it form no part of the present invention and are not here illustrated or described. $A^4$ is a shelf in the pit $A^2$ beneath the bottom of the pit and the skip and the hopper. On this shelf are supporting structures $A^5$ positioned on the shelf on the pit and supported by transverse struts $A^6$. $A^7$ is a fixed chute having a bottom $A^8$ extending down in general continuation with the floor of the hopper A. It will be noted that this chute has side walls. The chute is supported by the framework $A^9$ which projects outwardly, being anchored on the foundation beams $A^{10}$ embedded in the concrete wall of the pit. $A^{11}$ is a reinforcing angle for the side walls of the chute $A^7$, which extend well up above the bottom $A^8$, the chute being closed near the top by a baffle or cover plate $A^{12}$ having an adjustable extension $A^{13}$. The radial front edge of the side walls of the chute $A^7$ are provided with angular sealing strips $A^{14}$.

B, B are pivot shafts mounted in bearings $B^1$ on the supports $A^5$ and $A^9$. Mounted for rotation with the pivot shafts B are circular end plates $B^2$, $B^2$. Carried by the circular end plates is the pivot chute $B^3$ adapted to be moved approximately into line with the bottom of the chute $A^7$ as shown in Figure 1 or to be raised thereabove as shown in Figure 2. Extending downwardly from the bottom of the chute $B^3$ at its inner end and supported on the end plates $B^2$ is a curved undercut gate $B^4$. The relation between this gate and the outward extension $A^{15}$ of the floor plate $A^8$ being such that the undercut gate comes in just at the end of this extension. The lip $B^5$ on the extension $A^{15}$ is provided with an adjustable seal or packing strip $B^6$ adapted to close the opening between gate $B^4$ and bottom chute plate $A^8$. $B^7$, $B^7$ are reinforcing channels extending across the end plates $B^2$ and reinforcing the side walls of the chute $B^3$. The chute $B^3$ carries reinforcing shoes $B^8$, is open at its end where it may discharge into the skip and is generally open at the top except for a terminal cross plate $B^9$ and is provided with a damming baffle plate $B^{10}$ though under certain conditions more than one of such baffle or damming plates might be used to prevent overflow of the material, the presence of which divides the open part of the top of the chute into louvres or spaces, one between the baffle plate and the closed top of the fixed chute, the other between the baffle plate and the cross plate $B^9$. Mounted on either side of the end plates $B^2$ and in alignment with the sealing strips $A^{14}$ are arcuate sealing bars $B^{12}$.

Arranged about the outer periphery of the end plates $B^2$ are a pair of curved concentric channels C, $C^1$. These channels at their ends engage one of the reinforcing members $B^7$ and intermediate their ends are reinforced by the radial arm $C^2$. $C^3$, $C^3$ are reinforcing cover plates associated with said channels. Extending outwardly in both directions from the radial arms $C^2$ between the channels are curved holding bolts $C^5$ upon which are strung a series of counterweight elements $C^6$ held in position on these holding bolts by nuts $C^7$. It will be noted that the counterweight thus formed falls within the periphery of the end plates and within the periphery of the undercut gate so that an exceedingly compact arrangement is provided.

D is a cross head extending across beneath the skip $A^3$ adapted to travel in cross head guides $D^1$ and provided with a contact strip $D^2$ adapted to be engaged by the bottom of the skip $A^3$, there being springs $D^3$ interposed between the cross head D and the contact strip $D^2$. $D^4$, $D^4$ are links pivoted on the cross head D extending up one on each side of the chute $B^3$ where they terminate in spring held end bearings $D^5$ pivoted on the rod $D^6$ on the gate. When the skip comes down it moves the cross head down to cause rotation of the undercut gate and the chute. Located on the upper edge of the bucket are brackets $D^7$ carrying rollers $D^8$ adapted to engage the shoe $B^8$ on the chute. The purpose of this roller and shoe engagement is to cause the upward movement of the bucket to force the cute into the inoperative position carrying with it the undercut gate. The fact that the counterweights tend to hold the chute and gate in the inoperative position insures that as the gate and chute are swung upward by the movement of the skip, the chute will go on far enough to clear the skip. The movement of the gate and chute in the clockwise direction toward the inoperative position being limited by stop lugs $D^9$ carried by the channels C on the end plates $B^2$ which stop lugs engage a spring supported beam $D^{10}$ on the frame $A^9$ to stop the movement of the chute and gate without excess jar.

The use and operation of my invention are as follows:

Starting with the parts in the position shown in Figure 1, coal or similar material runs out from the hopper through the fixed chute over the top of the undercut gate, thence along the pivoted chute to fill the skip. As soon as the skip is filled, the coal banks up in the pivoted chute, assuming its angle of repose between the end of the adjustable cover plate for the fixed chute and the baffles in the pivoted chute, it will be noted that the nose of the pivoted chute extends slightly into the skip. As the skip goes up the pivoted chute is rotated and gradually swings out of register with the skip. Some of the coal banked or dammed up in the pivoted chute drops in the skip. The rotation of the pivoted chute upward carries with it the undercut gate and cuts off the flow of coal through the fixed chute. Some of the coal which was in the pivoted chute remains therein and is carried up above the fixed top of the fixed gate. This coal has room to occupy within the space between the baffles and the top of the fixed chute so that movement of the chute is not interfered with by binding or jamming of the coal and flow is positively stopped.

On the downward movement of the empty skip, the skip engages the cross head, pulls the chute and gate from the position shown in Figure 2 to the position shown in Figure 1 and the cycle is repeated.

I claim:

1. In combination with a hoisting skip, a fixed chute covered thruout the major portion of its length, a combined gate and chute pivoted adjacent the end of and adapted to receive material from the fixed chute and to discharge it to the skip, the combined capacities of the chutes being materially less than the capacity of the skip, means for oscillating the pivoted chute and gate between delivery and closed positions, the fixed chute cover being enclosed within the side walls of the pivoted chute when the latter is in the closed position and when so enclosed forming one wall of a storage pocket adapted to receive material from the pivoted chute as it moves toward the closed position and to return such material to the pivoted chute as it moves toward the delivery position, means for guiding the skip along a vertical path toward and from the loading position.

2. In combination with a hoisting skip, a fixed chute covered throughout the major portion of its length, a combined gate and chute pivoted adjacent the end of and adapted to receive material from the fixed chute and to discharge it to the skip, the combined capacities of the chutes being materially less than the capacity of the skip, means for oscillating the pivoted chute and gate between delivery and closed positions, the pivoted chute being open along its top and enclosing the discharge end of the fixed chute, baffle plates in such open top, adapted, in the delivery position to dam the material when the skip is filled and adapted when in the closed position to overlie the covered portion of the fixed chute and to insure the deposit of material on the cover thereof, means for guiding the skip along a vertical path toward and from the loading position.

3. In combination with a hoisting skip, a fixed chute covered thruout the major portion of its length, a combined gate and chute pivoted adjacent the end of and adapted to receive material from the fixed chute and to discharge it to the skip, the combined capacities of the chutes being materially less than the capacity of the skip, means for oscillating the pivoted chute and gate between delivery and closed positions, the fixed chute cover being enclosed within the side walls of the pivoted chute when the latter is in the closed position and when so enclosed forming one wall of a storage pocket adapted to receive material from the pivoted chute as it moves toward the closed position and to return such material to the pivoted chute as it moves toward the delivery position, and sealing means interposed between the fixed and the pivoted chute where they cooperate to form the pocket, the pocket being bounded in part by such sealing means, means for guiding the skip along a vertical path toward and from the loading position.

4. In combination with a hoisting skip, a fixed chute covered throughout the major portion of its length, a combined gate and chute pivoted adjacent the end of and adapted to receive material from the fixed chute and discharge it to the skip, the combined capacities of the chutes being materially less than the capacity of the skip, means for oscillating the pivoted chute and gate between delivery and closed positions, the pivoted chute being open along its top and enclosing the discharge end of the fixed chute, baffle plates in such open top, adapted, in the delivery position to dam the material when the skip is filled and adapted when in the closed position to overly the covered portion of the fixed chute and to insure the deposit of material on the cover thereof and sealing means interposed between the inner wall of the pivoted chute and the outer wall of the fixed chute immediately adjacent that portion of the cover upon which material is deposited, means for guiding the skip along a vertical path toward and from the loading position.

Signed at Chicago, county of Cook and State of Illinois, this 1st day of February, 1928.

WILLIAM W. SAYERS.